United States Patent
Sethi et al.

(10) Patent No.: US 7,779,299 B2
(45) Date of Patent: Aug. 17, 2010

(54) EFFICIENTLY RE-STARTING AND RECOVERING SYNCHRONIZATION OPERATIONS BETWEEN A CLIENT AND SERVER

(75) Inventors: Ramandeep Sethi, Fremont, CA (US); Zhen Yang, San Ramon, CA (US); Tom Whittaker, Wanda, MN (US); Shoji Kuruvilla, Fremont, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 538 days.

(21) Appl. No.: 11/790,251

(22) Filed: Apr. 24, 2007

(65) Prior Publication Data

US 2008/0270832 A1 Oct. 30, 2008

(51) Int. Cl.
*G06F 11/00* (2006.01)
(52) U.S. Cl. .......................... 714/18; 714/15
(58) Field of Classification Search ............. 714/18, 714/15
See application file for complete search history.

(56) References Cited

U.S. PATENT DOCUMENTS

| | | | |
|---|---|---|---|
| 5,912,902 A * | 6/1999 | Monroe | 714/746 |
| 6,049,882 A * | 4/2000 | Paver | 713/322 |
| 6,098,180 A * | 8/2000 | Kobata et al. | 714/18 |
| 6,341,316 B1 | 1/2002 | Kloba et al. | |
| 2002/0032884 A1 | 3/2002 | Kobata et al. | |
| 2003/0177321 A1 | 9/2003 | Watanabe | |
| 2005/0262166 A1 | 11/2005 | Rajeev et al. | |

OTHER PUBLICATIONS

International Search Report dated Aug. 18, 2008, International Application No. PCT/US08/05149.

* cited by examiner

*Primary Examiner*—Robert Beausoliel
*Assistant Examiner*—Charles Ehne
(74) *Attorney, Agent, or Firm*—Sterne, Kessler, Goldstein & Fox PLLC

(57) ABSTRACT

Systems, methods and computer program products for efficiently re-starting and/or recovering interrupted synchronizations between a client and a server are described herein. A server transmits sync data to a client during a synchronization operation. The sync is interrupted for some reason prior to the client receiving all of the sync data. The client sends to the server a request to re-start the synchronization operation. The request includes information that identifies a point in the sync data that was received by the client prior to interruption of the sync. Such information may include (a) information identifying the last data received by the client prior to interruption of the sync; and/or (b) information identifying the next data needed by the client upon re-start of the sync. Thereafter, the server re-starts the sync by transmitting to the client the sync data starting from said point in said sync data identified by said request.

24 Claims, 8 Drawing Sheets

US 7,779,299 B2

EFFICIENTLY RE-STARTING AND RECOVERING SYNCHRONIZATION OPERATIONS BETWEEN A CLIENT AND SERVER

BACKGROUND OF THE INVENTION

1. Field of the Invention

The present invention is generally directed to synchronization between clients and servers in a computing environment.

2. Background Art

FIG. 1 illustrates a computing environment 102 that includes a server 104 and a client 106 (in practice, a plurality of servers 104 and clients 106 may operate in the computing environment 102). From time to time, client 106 synchronizes its state (data, applications, etc.) with server 104.

For example, according to the AVANTGO service (www.avantgo.com) available from iAnywhere Solutions, Inc., a Sybase company, client 106 receives content from one or more web sites 108 when it syncs with server 104. More particularly, server 104 retrieves data from web sites 108 corresponding to channels to which client 106 is subscribed. During a sync operation, server 104 transfers such data to client 106 via the Internet 110.

It is not unusual for the sync to be interrupted before all the data has been successfully received by the client 106. An interruption may result from any number of reasons, such as but not limited to issues with the server 104, issues with the client 106, and/or issues with the connection between the server 104 and client 106. For example, where the client 106 is in communication with the Internet 110 (and thus the server 104) via a wireless link, the sync will be interrupted if the wireless link fails or becomes unavailable.

Conventionally, interrupted syncs are re-started from the beginning. This requires that the server 104 re-transmit all the data to the client 106, even data that client 106 had successfully received prior to interruption of the sync. This approach is greatly inefficient, as such unnecessary re-transmission of data is a burden on server, client and network resources.

Accordingly, what is needed is an improved approach for handling interrupted syncs between clients and servers.

BRIEF SUMMARY OF THE INVENTION

The present invention is directed to systems, methods and computer program products for efficiently re-starting interrupted synchronizations between a client and a server.

The invention operates as follows. A server transmits sync data to a client during a synchronization operation. If the sync is interrupted for some reason prior to the client receiving all of the sync data, the client sends to the server a request to re-start the synchronization operation. The request includes information that identifies a point in the sync data that was received by the client prior to interruption of the sync. Such information may include (a) information identifying the last data received by the client prior to interruption of the sync; and/or (b) information identifying the next data needed by the client upon re-start of the sync.

Thereafter, the server re-starts the sync by transmitting to the client the sync data starting from the last point in the sync data that was received by the client prior to interruption of the synchronization operation. Prior to doing so, the server determines whether the sync data is available in either a memory cache or a database. If the sync data is available, then the sync is re-started as described above. If the sync data is not available, then the server initializes a new synchronization operation with the client. This may involve, for example, sending a message to the client to inform the client that a new sync is necessary.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
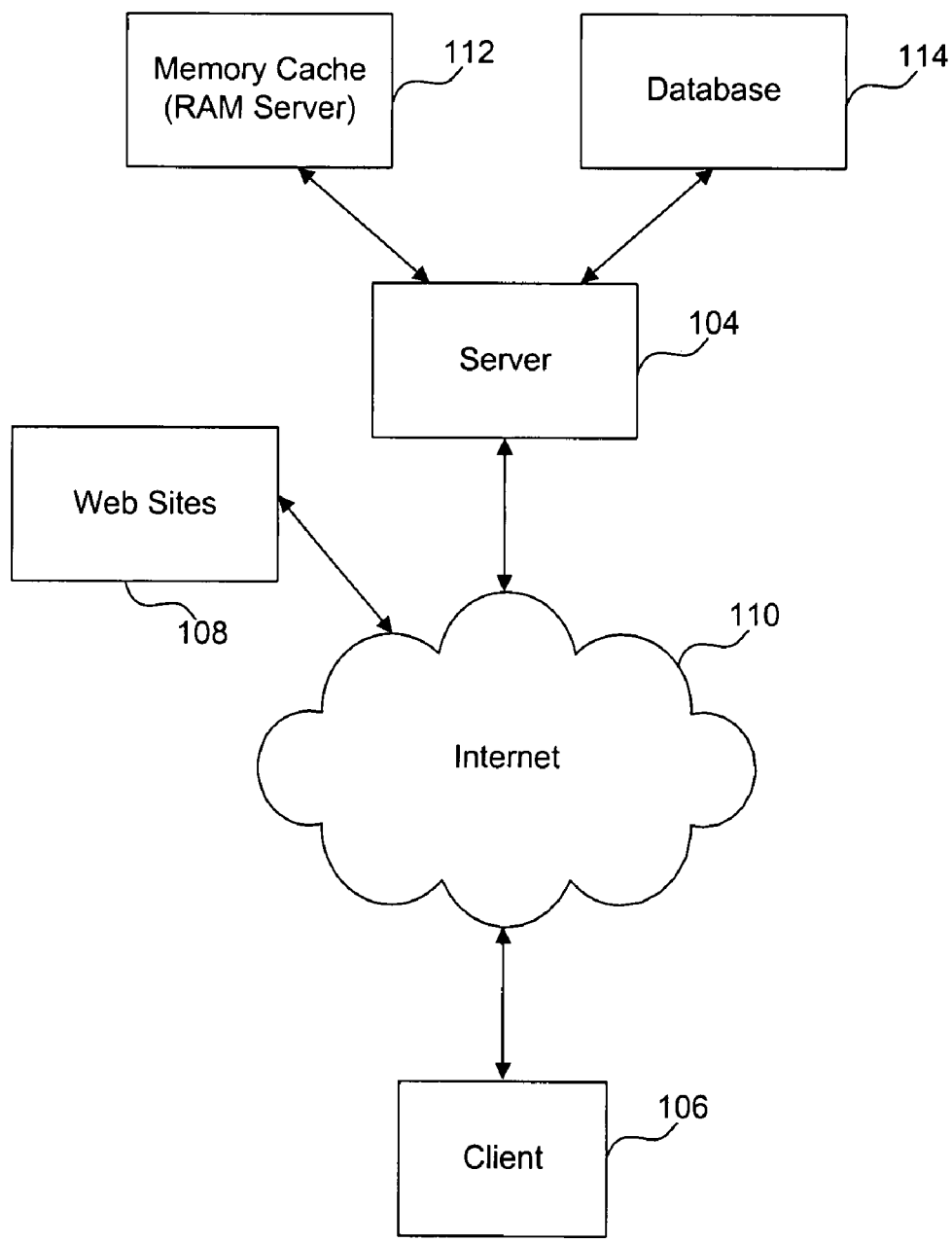
FIG. 1 illustrates an example computing environment according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to systems, methods and computer program products for efficiently re-starting interrupted synchronization operations between a client and a server. According to embodiments of the invention, when a sync is interrupted, the sync is re-started from the point of interruption, such that the server is not required to re-send data that was successfully received by the client prior to the interruption. The invention improves server, client and network performance because it eliminates in most cases unnecessary server/client data transmissions following an interrupted sync.

It is noted that the invention could be described as recovering an interrupted synchronization operation between a client and server, because according to the present invention it is not necessary to re-start the sync from the beginning. Instead, the invention causes the sync to begin from where it left off, thereby recovering the sync.

The invention shall be described with reference to the example computing environment 102 shown in FIG. 1, which is provided solely for purposes of illustration, and not limitation. Computing environment 102 includes a server 104 and a client 106. Although only a single server 104 and client 106 are shown in FIG. 1, in practice computing environment 102 may include any number of servers 104 and clients 106.

According to an embodiment, server 104 includes a memory cache 112 and a database 114. Memory cache 112 (also called a RAM server) is preferably a stand alone server that comprises a large amount of RAM (random access memory), such as but not limited to 16 Gbytes of RAM. Database 114 can be any type of well known database residing, for example, in a secondary storage device, such as a hard drive, or as a database server. Data can be accessed faster with the memory cache 112 than the database 114. Accordingly, in an embodiment of the invention, data to be sync'ed with client 106 (hereafter called "sync data") is stored in memory cache 112. This operation of the invention is described below in Section 4.

In an embodiment, the sync data corresponds to content of channels to which the client 106 is subscribed. Either before or during initiation of a sync with client 106, the server 104 retrieves sync data from web sites 108 associated with the channels. During the sync, the server 104 transmits the sync data to the client 106. Thereafter, the client 106 can surf such channels in an off-line browsing mode. Such functionality is provided by the AVANTGO service (www.avantgo.com) available from iAnywhere Solutions, Inc., a Sybase company.

However, the invention is not limited to this example embodiment. Instead, the invention is applicable to any client/server syncing of any type of data from any source. The sync data may include objects of any type, including but not limited to music, video, email, information, applications, data, etc.

2. Partitioned Sync Data Embodiment

Figure 3:
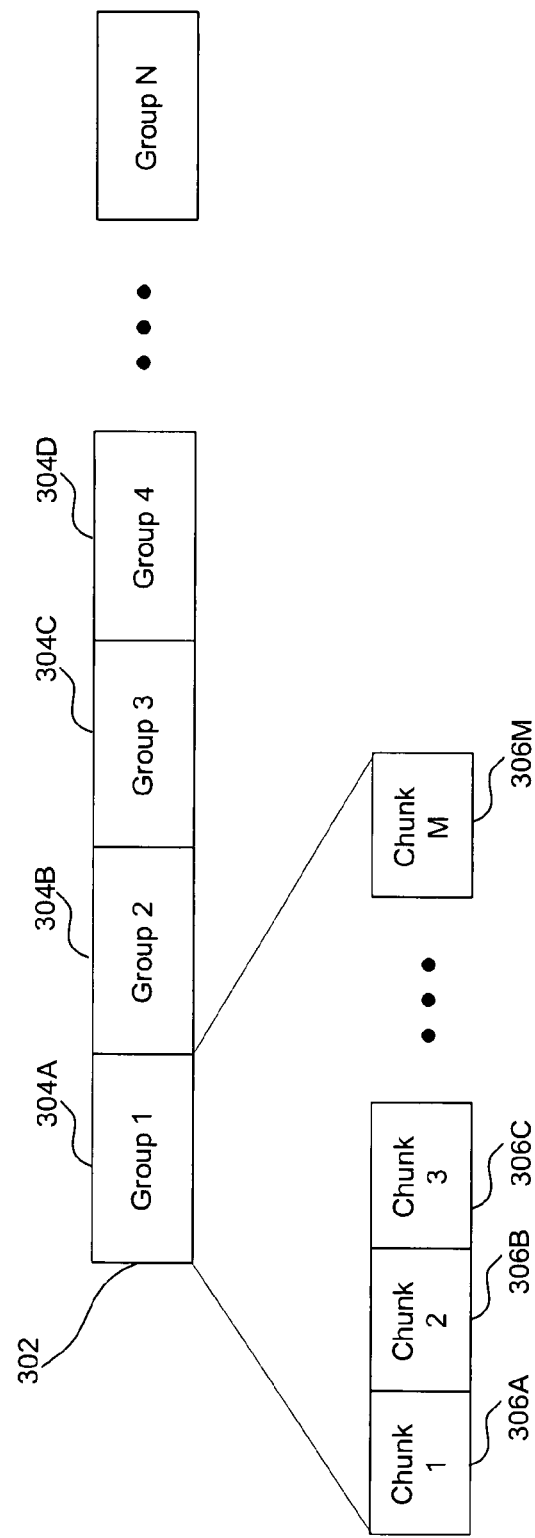
FIG. 3 illustrates example sync data partitioned into groups and chunks.

In an embodiment, the data to be sync'ed with the client 106 (the "sync data") is partitioned into groups. An example of this is shown in FIG. 3, where sync data 302 has been partitioned into N groups 304 (in practice, the number of groups 304 in sync data 302 depends on the size of each group 304 and the size of the sync data 302). Each group 304 may be further partitioned into chunks 306. In the example of FIG. 3, the groups 304 are each partitioned into M chunks 306. It is noted that the example of FIG. 3 is provided solely for illustrative purposes, and is not limiting. The size of groups 304 and chunks 306 and the number of chunks 306 in a group 304 are implemented dependent. These parameters may also be administrator and/or user adjustable.

In some embodiments, chunk size equals group size. In other words, each group 304 contains a single chunk 306. Or, put another way, in such embodiments, groups 304 are not partitioned into chunks 306.

Partitioning the sync data into groups and/or chunks is useful when working with devices that have restrictions on the amount of data they can receive and/or send at any given time. For example, the maximum data block that can be received by BLACKBERRY devices is 128 kbytes. Accordingly, in this example, the size of each chunk 306 is set at 128 kbytes or less. Both the server 104 and the client 106 are aware of the size of each chunk 306, and the number of chunks 306 in each group 304.

Figure 2:
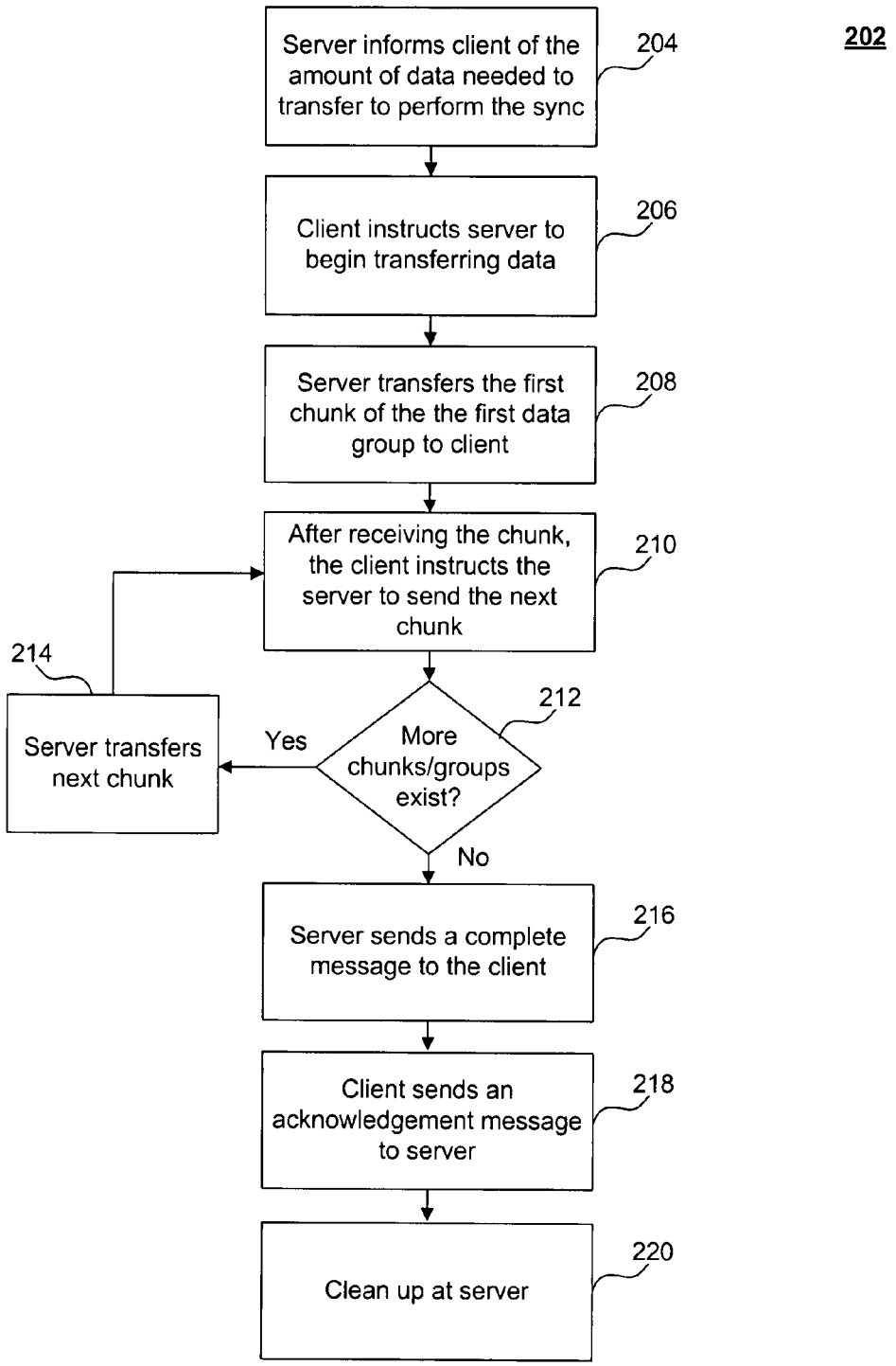
FIG. 2 is a flowchart illustrating a synchronization operation where sync data is partitioned into groups and chunks, according to an embodiment of the invention.

FIG. 2 is a flowchart 202 illustrating the operation of server 104 and client 106 during a synchronization operation. FIG. 2 is described with reference to the partitioning example of FIG. 3 for illustrative purposes only. It should be understood that FIG. 2 is also applicable to other partitioning depths and schemes, as will be appreciated by persons skilled in the relevant arts based on the teachings provided herein.

Flowchart 202 commences after either the client 106 or the server 104 has initialized a sync (preferably, the sync is initialized by the client 106, but in other embodiments the sync is initialized by the server 104). Flowchart 202 also commences after the server 104 has identified and/or retrieved the data to be transferred to the client 106 during the sync (the "sync data"). Preferably, and as further described in Section 4, the sync data is stored in either the memory cache 112 or the database 114.

In step 204, server 104 sends a message to client 106 to inform client 106 of the size of the sync data 302. In other words, server 104 informs client 106 of the amount of data that will be transmitted to client 106 during the sync.

In step 206, client 106 sends a message to server 104 to instruct the server 104 to begin transferring the sync data 302.

In step 208, server 104 begins transferring the first chunk 306A of the first data group 304A to client 106. Client 106 keeps track of the chunks 306 and groups 304 that it successfully receives.

In step 210, after successfully receiving the first chunk 306A of the first data group 304A, the client 106 sends a message to server 104 to instruct server 104 to send the next chunk. The client 106 is able to determine when it has successfully received chunks 306 and groups 304 since it knows the size of each chunk 306 and group 304.

In some embodiments, client 106 may coordinate with server 104 at the group 304 level, instead of the chunk 306 level. That is, in step 210, instead of sending a "next" command to server 104 after receipt of each chunk 306, client may send a "next" command to server 104 after receipt of each group 304.

In step 212, server 104 determines whether there are more chunks 306/groups 304 in the sync data 302 to transmit to client 106. If there are, server 104 begins transferring the next chunk 306/group 304 to client 106 in step 214.

Otherwise, in step 216, server 104 sends a message to client 106 to inform client 106 that the sync is complete. Such message can be distinct from any chunk, or can be included with the last chunk sent to client 106.

In step 218, client 106 sends an acknowledgement message to server 104.

In step 220, after receipt of client 106's acknowledgement message, server 104 performs sync clean up operations. Such operations include deleting the sync data 302 from memory cache 112 and/or database 114.

Figure 4:
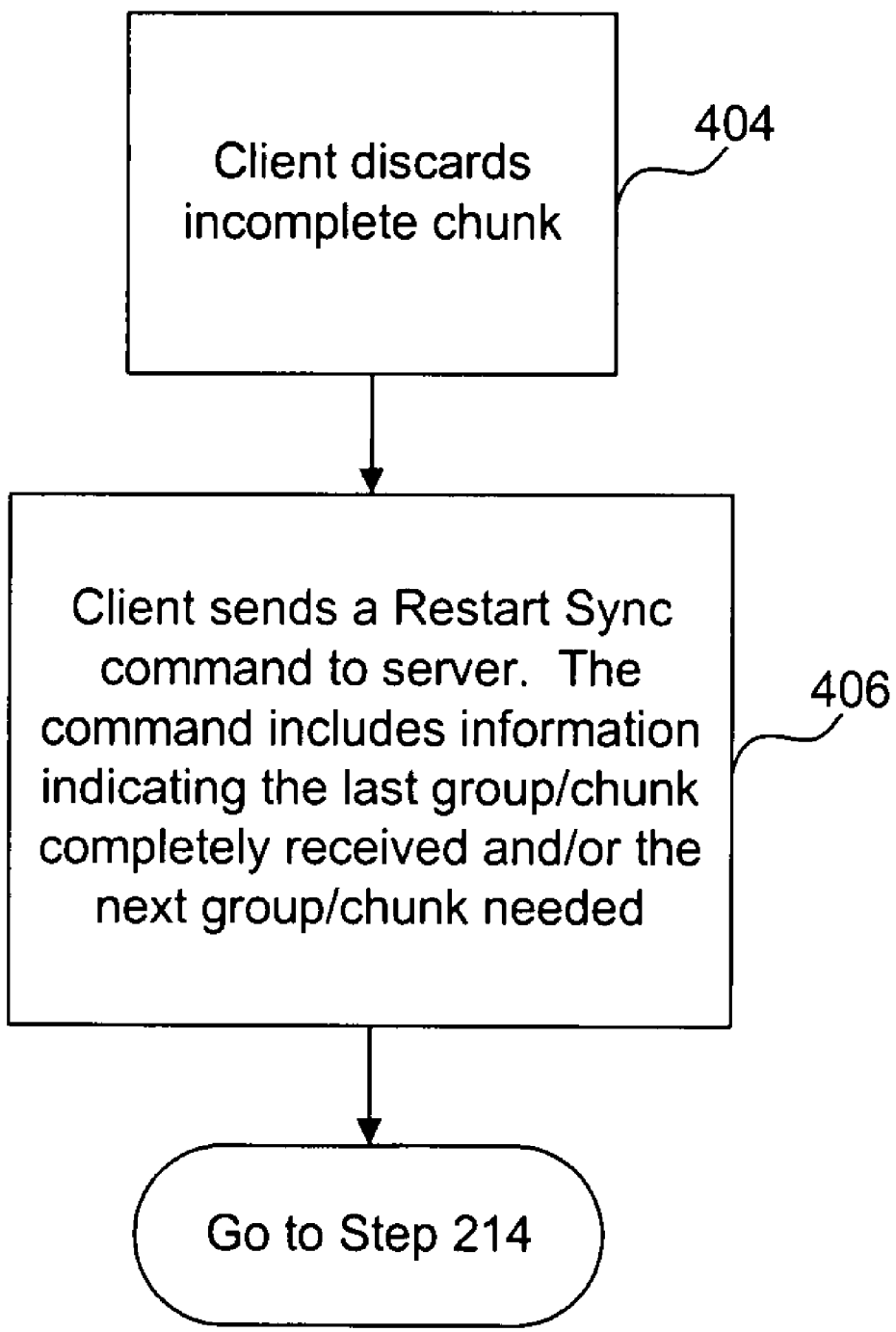
FIG. 4 is a flowchart illustrating how an interrupted sync is re-started, according to an embodiment of the invention.

At any point in the processing of flowchart 202, the sync may be interrupted due to any number of reasons, including but not limited to server issues, client issues, network issues, etc. FIG. 4 is a flowchart 402 that illustrates a process for re-starting an interrupted synchronization operation.

In step 404, client 106 discards the chunk 306 that was incompletely received prior to interruption of the sync.

In step 406, client 106 sends a "re-start sync" command to server 104. This command includes information indicating either (1) the last chunk 306 successfully received; or (2) the next chunk 306 needed.

Control then passes back to step 214 of FIG. 2, wherein server 104 re-starts the sync with the chunk 306 indicated in the "re-start sync" command. In some cases, it may not be possible to re-start the sync because the sync data 302 may no longer exist in either the memory cache 112 or the database 114. In this case, the server 104 must re-start the sync from the beginning. Such operation is further described in Section 4.

In an alternative embodiment, the sync is re-started at the group 304 level. According to this embodiment, in step 404, client 106 discards the group 304 that was incompletely received prior to interruption of the sync, including any chunks 306 of this group 304 that were successfully received prior to the interruption. In step 406, client 106 sends a "re-start sync" command to server 104, wherein this command includes information indicating either (1) the last group 304 successfully received; or (2) the next group 306 needed. Control then passes to step 214 of FIG. 2, as described above.

3. Non-Partitioned Sync Data Embodiment

In an embodiment, the sync data is not partitioned. This embodiment is applicable, for example, when working with devices that do not have restrictions on the amount of data they can receive and/or send at any given time, such as PALM and POCKETPC devices.

Figure 5:
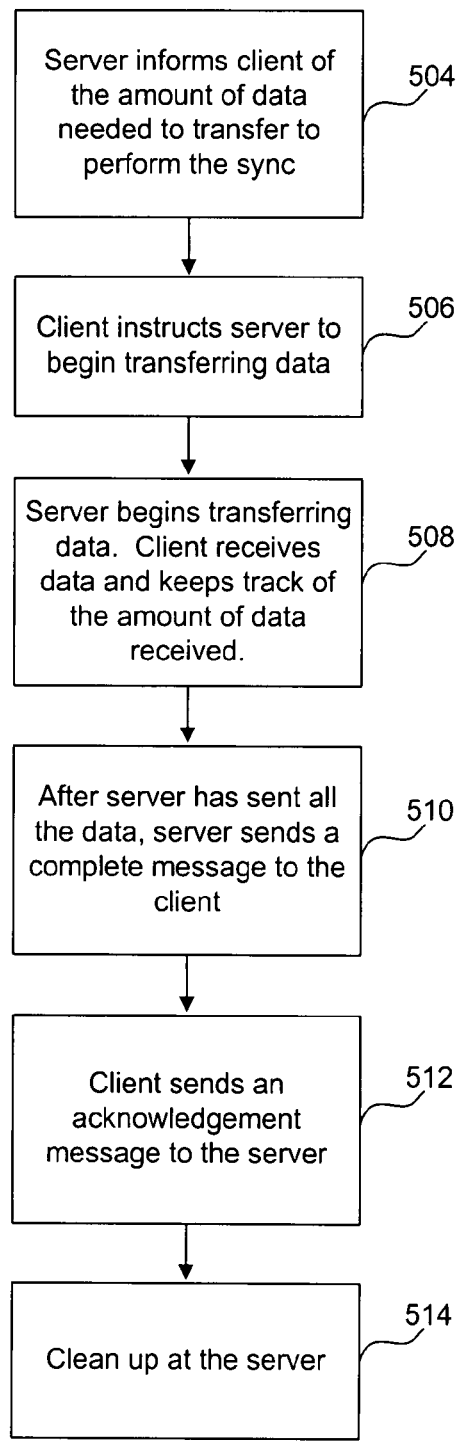
FIG. 5 is a flowchart illustrating a synchronization operation where sync data is not partitioned, according to an embodiment of the invention.

FIG. 5 is a flowchart 502 illustrating the operation of server 104 and client 106 during a synchronization operation, where the sync data is not partitioned. Flowchart 502 commences after either the client 106 or the server 104 has initialized the sync (preferably, the sync is initialized by the client 106, but in other embodiments the sync is initialized by the server 104). Flowchart 502 also commences after the server 104 has identified and/or retrieved the data to be transferred to the client 106 during the sync (the "sync data"). Preferably, and as further described in Section 4, the sync data is stored in either the memory cache 112 or the database 114.

In step 504, server 104 sends a message to client 106 to inform client 106 of the size of the sync data. In other words, server 104 informs client 106 of the amount of data that will be transmitted to client 106 during the sync.

In step 506, client 106 sends a message to server 104 to instruct the server 104 to begin transferring the sync data.

In step 508, server 104 begins transferring the sync data. Client 106 keeps track of the amount of data that it successfully receives.

In step 510, after server 104 has sent all of the sync data to client 106, server 104 sends a message to client 106 to inform client 106 that the sync is complete. Such message can be distinct from the sync data, or can be included with the last data sent to client 106.

In step 512, client 106 sends an acknowledgement message to server 104.

In step 514, after receipt of client 106's acknowledgement message, server 104 performs sync clean up operations. Such operations include deleting the sync data from memory cache 112 and/or database 114.

Figure 6:
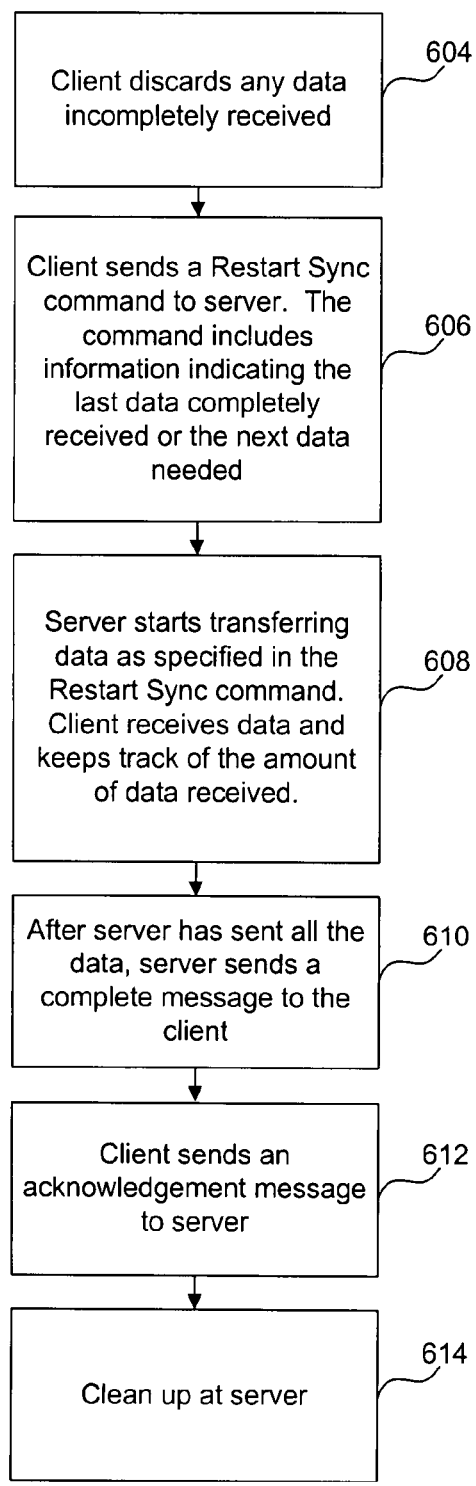
FIG. 6 is a flowchart illustrating how an interrupted sync is re-started, according to an alternative embodiment of the invention.

At any point in the processing of flowchart 502, the sync may be interrupted due to any number of reasons, including issues but not limited to server issues, client issues, network issues, etc. FIG. 6 is a flowchart 602 that illustrates a process for re-starting an interrupted synchronization operation.

In step 604, client 106 discards any data that it incompletely received prior to interruption of the sync.

In step 606, client 106 sends a "re-start sync" command to server 104. This command includes information indicating either (1) the last data successfully received (for example, the last byte of the sync data successfully received); or (2) the next data needed (for example, the next byte of the sync data needed).

In step 608, server 104 re-starts the sync beginning with that part of the sync data indicated in the "re-start sync" command. Client 106 keeps track of the amount of data that it successfully receives.

In some cases, it may not be possible to re-start the sync because the sync data may no longer exist in either the memory cache 112 or the database 114. In this case, the server 104 must re-start the sync from the beginning. Such operation is further described in Section 4.

In step 610, after server 104 has sent all of the sync data to client 106, server 104 sends a message to client 106 to inform client 106 that the sync is complete. Such message can be distinct from the sync data, or can be included with the last data sent to client 106.

In step 612, client 106 sends an acknowledgement message to server 104.

In step 614, after receipt of client 106's acknowledgement message, server 104 performs sync clean up operations. Such operations include deleting the sync data from memory cache 112 and/or database 114.

4. Server Operation

As described above, according to an embodiment of the invention, the sync data is preferably stored in the memory cache 112 of server 104, because access to data in memory cache 112 is faster than access to data in database 114. However, sync data for an incomplete sync (i.e., a sync where the client 106 has not acknowledge receipt of a "sync complete" message, see step 218 in FIG. 2 and step 512 in FIG. 5) may be moved from memory cache 112 to database 114, depending on system and memory capacity and needs. Also, eventually, sync data for an incomplete sync may be deleted from memory cache 112 and database 114, depending on system and memory capacity and needs. Server 104 takes these factors into consideration when re-starting a sync.

Figure 7:
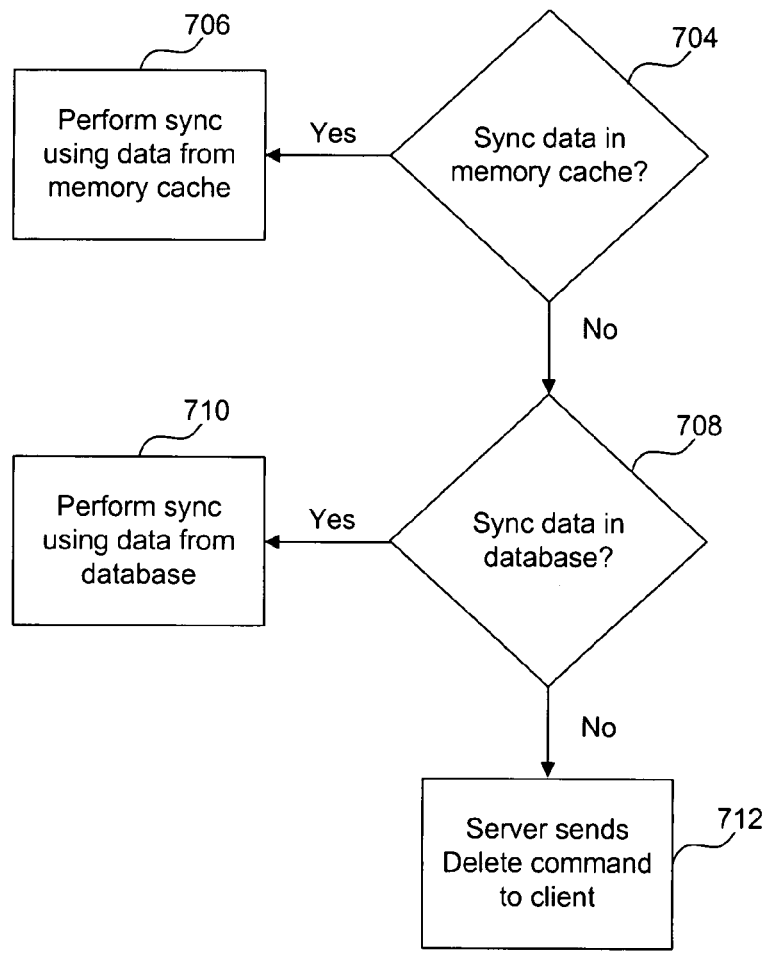
FIG. 7 is a flowchart illustrating operation of a server during re-start of an interrupted sync operation.

In particular, FIG. 7 is a flowchart 702 illustrating the operation of server 104 when it responds to receipt of a "re-start sync" command from client 106 (see step 406 in FIG. 4 and step 606 in FIG. 6).

In step 704, server 104 determines whether the sync data indicated by the "re-start sync" command is stored in the memory cache 112. If it is, then in step 706 server 104 re-starts and continues the sync as described above, using the sync data in the memory cache 112.

Otherwise, in step 708, server 104 determines whether the sync data indicated by the "re-start sync" command is stored in database 114. If it is, then in step 710 server 104 re-starts and continues the sync as described above, using the sync data in database 114.

If, in step 708, server 104 determines that the sync data is not in the database 114, then in step 712 server 104 sends a message to client 106 to inform client 106 that it is necessary to perform a completely new sync, with new sync data. Upon receipt of this message, client 106 deletes all data that it had received prior to interruption of the prior sync. Thereafter, a new sync with new sync data is initialized between client 106 and server 104. Such operation is described above.

5. Example Computer Implementation

Figure 8:
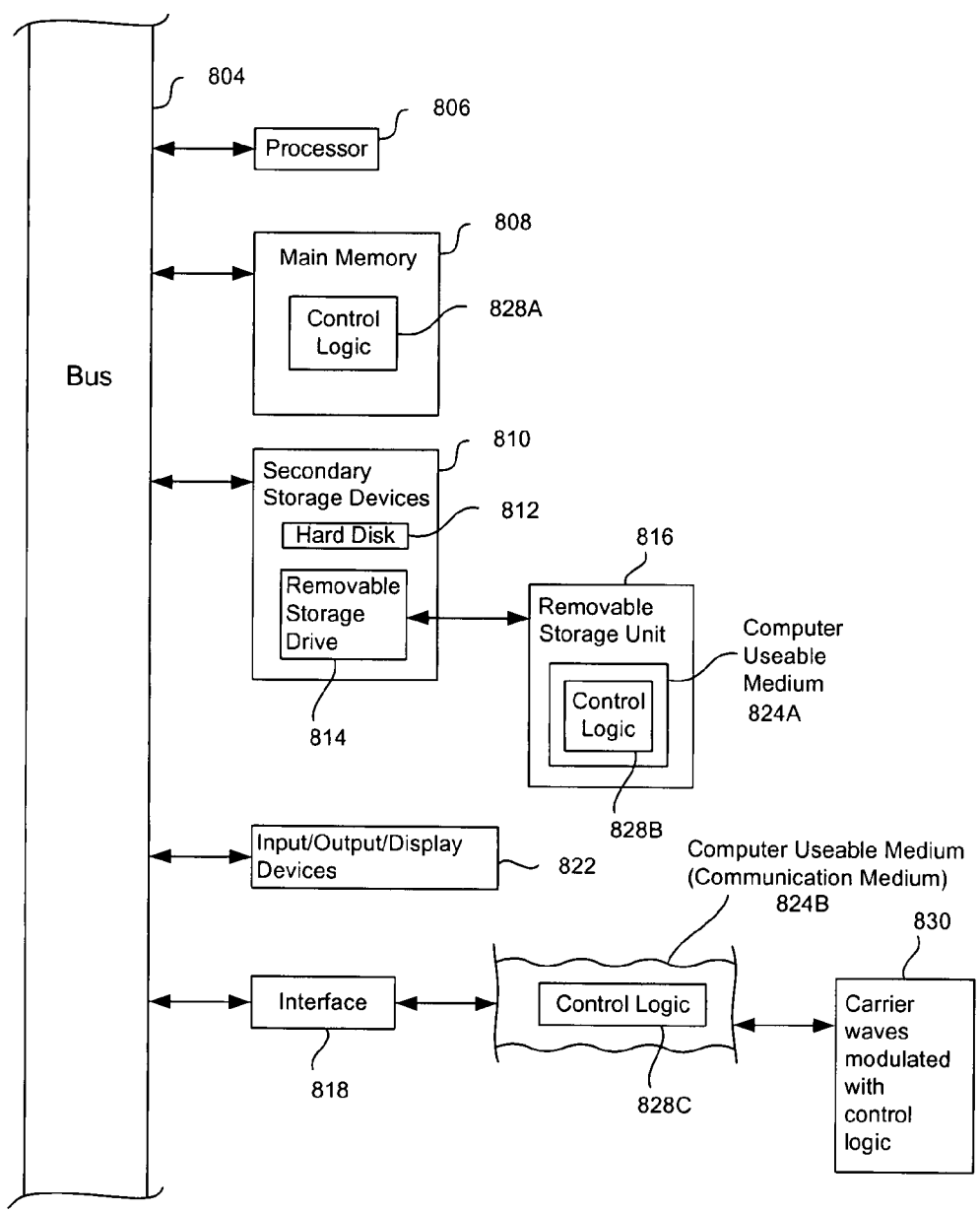
FIG. 8 illustrates an example computer useful for implementing components of the invention.

In an embodiment of the present invention, the system and components of the present invention described herein are implemented using well known computers, such as computer 802 shown in FIG. 8. For example, server 104, memory cache 112, database 114 and client 106 can be implemented using computers 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a program storage device. This includes, but is not limited to, the computer 802, the main memory 808, the secondary storage devices 810, and the removable storage unit 816. Any such program storage device, as well as the carrier waves modulated with control logic 830, may be referred to as a computer program product. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

6. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of recovering a synchronization operation with a client, comprising:

transmitting sync data to said client during a synchronization operation, wherein said synchronization operation is interrupted prior to said client receiving all of said sync data, wherein said sync data is partitioned into two or more groups at least one of which is partitioned into two or more chunks;

receiving from said client a request to re-start said synchronization operation, wherein said request includes information that identifies a point in said sync data received by said client prior to interruption of said synchronization operation; and transmitting to said client said sync data starting from said point in said sync data identified by said request.

2. The method of claim 1, wherein said request to re-start said synchronization operation is selected from (a) a group level restart, and (b) a chunk level restart, wherein said information comprises at least one of:

(a) information identifying a last group or chunk received by said client prior to interruption of said sync; and (b) information identifying a next group or chunk needed by said client upon re-start of said synchronization operation.

3. The method of claim 1, further comprising:

determining whether said sync data is available after receipt of said re-start request; and initializing a new synchronization operation with said client if said sync data is not available.

4. The method of claim 3, wherein said step of initializing a new synchronization operation with said client comprises:

sending a message to said client to inform said client that a new synchronization operation is required.

5. The method of claim 1, further comprising:

determining a data size restriction of said client.

6. The method of claim 5, further comprising:

sizing each group or chunk based on said data size restriction.

7. A method of recovering a synchronization operation with a server, comprising:

receiving from a server sync data during a synchronization operation, wherein said synchronization operation is interrupted prior to receiving all of said sync data, wherein said sync data is partitioned into two or more groups at least one of which is partitioned into two or more chunks;

sending to said server a request to re-start said synchronization operation, wherein said request includes information that identifies a point in said sync data received prior to interruption of said synchronization operation; and receiving from a server said sync data starting from said point in said sync data identified by said request.

8. The method of claim 7, wherein said request to re-start said synchronization operation is selected from (a) a group level restart, and (b) a chunk level restart, wherein said information comprises at least one of:
   (a) information identifying a last group or chunk received prior to interruption of said sync; and
   (b) information identifying a next group or chunk needed upon re-start of said synchronization operation.

9. The method of claim 7, wherein each group is sized based on data size restrictions of said client.

10. The method of claim 7, wherein each chunk is sized based on data size restrictions of said client.

11. A server, comprising:
   a memory cache;
   a database;
   a transmission interface configured to transmit sync data to a client during a synchronization operation, wherein said sync data is stored in said memory cache or said database, wherein said synchronization operation is interrupted prior to said client receiving all of said sync data, further wherein said sync data is partitioned into two or more groups at least one of which is partitioned into two or more chunks; and
   a reception interface configured to receive from said client a request to re-start said synchronization operation, wherein said request includes information that identifies a point in said sync data received by said client prior to interruption of said synchronization operation,
   wherein said transmission interface is further configured to transmit to said client said sync data starting from said point in said sync data identified by said request.

12. The server of claim 11, wherein said request to re-start said synchronization operation is selected from (a) a group level restart, and (b) a chunk level restart, wherein said information comprises at least one of:
   (a) information identifying a last group or chunk received by said client prior to interruption of said sync; and
   (b) information identifying a next group or chunk needed by said client upon re-start of said synchronization operation.

13. The server of claim 11, further comprising:
   means for determining whether said sync data is available in said memory cache or said database after receipt of said re-start request; and
   means for initializing a new synchronization operation with said client if said sync data is not available.

14. The server of claim 11, wherein said transmission interface is further configured to determine a data size restriction of said client.

15. The server of claim 14, wherein said transmission interface is further configured to size each group or chunk based on said data size restrictions of said client.

16. A computer-readable medium having computer-executable instructions stored therein that, when executed by a computing device, causes said computing device to perform a method of recovering a synchronization operation with a client, said method comprising:
   transmitting sync data to said client during a synchronization operation, wherein said synchronization operation is interrupted prior to said client receiving all of said sync data, wherein said sync data is partitioned into two or more groups at least one of which is partitioned into two or more chunks;
   receiving from said client a request to re-start said synchronization operation, wherein said request includes information that identifies a point in said sync data received by said client prior to interruption of said synchronization operation; and
   transmitting to said client said sync data starting from said point in said sync data identified by said request.

17. The computer-readable medium of claim 16, wherein said request to re-start said synchronization operation is selected from (a) a group level restart, and (b) a chunk level restart, wherein said information comprises at least one of:
   (a) information identifying a last group or chunk received by said client prior to interruption of said sync; and
   (b) information identifying a next group or chunk needed by said client upon re-start of said synchronization operation.

18. The computer-readable medium of claim 16, wherein said method further comprises:
   determining whether said sync data is available after receipt of said re-start request; and
   initializing a new synchronization operation with said client if said sync data is not available.

19. The computer-readable medium of claim 16, the method further comprising:
   determining a data size restriction of said client.

20. The computer-readable medium of claim 19, the method further comprising:
   sizing each group or chunk based on said data size restriction.

21. A computer-readable medium having computer-executable instructions stored therein that, when executed by a computing device, causes said computing device to perform a method of recovering a synchronization operation with a server, said method comprising:
   receiving from said server sync data during a synchronization operation, wherein said synchronization operation is interrupted prior to receiving all of said sync data, wherein said sync data is partitioned into two or more groups at least one of which is partitioned into two or more chunks;
   sending to said server a request to re-start said synchronization operation, wherein said request includes information that identifies a point in said sync data received prior to interruption of said synchronization operation; and
   receiving from a server said sync data starting from said point in said sync data identified by said request.

22. The computer-readable medium of claim 21, wherein said request to re-start said synchronization operation is selected from (a) a group level restart, and (b) a chunk level restart, wherein said information comprises at least one of:
   (a) information identifying a last group or chunk received prior to interruption of said sync; and
   (b) information identifying a next group or chunk needed upon re-start of said synchronization operation.

23. The computer-readable medium of claim 21, wherein each group is sized based on data size restrictions of said client.

24. The computer-readable medium of claim 21, wherein each chunk is sized based on data size restrictions of said client.

* * * * *